United States Patent
Vass et al.

(10) Patent No.: US 9,473,539 B2
(45) Date of Patent: Oct. 18, 2016

(54) EXTENDING SIP P-SERVED USER HEADER OVER IMS INTERFACES

(75) Inventors: Nándor Vass, Herceghalom (HU); Jan Dahl, Älvsjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 343 days.

(21) Appl. No.: 14/347,062

(22) PCT Filed: Sep. 28, 2011

(86) PCT No.: PCT/EP2011/066879
§ 371 (c)(1),
(2), (4) Date: Mar. 25, 2014

(87) PCT Pub. No.: WO2013/044952
PCT Pub. Date: Apr. 4, 2013

(65) Prior Publication Data
US 2014/0237127 A1    Aug. 21, 2014

(51) Int. Cl.
*H04L 29/06* (2006.01)
*H04M 15/00* (2006.01)
(Continued)

(52) U.S. Cl.
CPC ....... *H04L 65/1006* (2013.01); *H04L 12/1425* (2013.01); *H04L 12/1446* (2013.01); *H04L 65/105* (2013.01); *H04L 65/1016* (2013.01); *H04L 65/1036* (2013.01); *H04L 65/1069* (2013.01); *H04M 15/06* (2013.01); *H04M 15/41* (2013.01); *H04M 15/43* (2013.01);
(Continued)

(58) Field of Classification Search
None
See application file for complete search history.

(56) References Cited

U.S. PATENT DOCUMENTS

| | | | |
|---|---|---|---|
| 8,266,302 B2* | 9/2012 | Przybysz | H04L 29/06027 709/228 |
| 8,824,339 B2* | 9/2014 | Yared | H04L 29/06 370/259 |
| 8,984,152 B1* | 3/2015 | Van Elburg | 370/310 |

(Continued)

FOREIGN PATENT DOCUMENTS

| | | |
|---|---|---|
| CN | 101123512 A | 2/2008 |
| WO | 2007060074 A1 | 5/2007 |

(Continued)

OTHER PUBLICATIONS

3rd Generation Partnership Project, "3rd Generation Partnership Project; Technical Specification Group Services and System Aspects; Telecommunication management; Charging management; IP Multimedia Subsystem (IMS) charging (Release 10)", Technical Specification, 3GPP TS 32.260 V10.2.0, Dec. 1, 2010, pp. 1-122, 3GPP, France.

(Continued)

*Primary Examiner* — Ninos Donabed
(74) *Attorney, Agent, or Firm* — Coats & Bennett, PLLC

(57) ABSTRACT

The invention provides a method of handling SIP messages in an IMS core network. The method comprises receiving at a first network entity, a first SIP message that includes an identification of a served user to which the first SIP message relates. The first IMS network entity is in the served user's home network. The first SIP message is forwarded as a second SIP message to a second network entity in the served user's home IMS core network. The second SIP message includes a P-Served-User, PSU, header identifying the served user.

20 Claims, 6 Drawing Sheets

(51) Int. Cl.
*H04L 12/14* (2006.01)
*H04M 15/06* (2006.01)

(52) U.S. Cl.
CPC .......... *H04M 15/57* (2013.01); *H04M 15/63* (2013.01); *H04L 65/1096* (2013.01)

(56) References Cited

U.S. PATENT DOCUMENTS

| | | | | |
|---|---|---|---|---|
| 2009/0073964 | A1* | 3/2009 | Milinski | H04L 29/06027 370/352 |
| 2010/0153567 | A1* | 6/2010 | Lu | H04L 65/1073 709/229 |
| 2010/0246780 | A1* | 9/2010 | Bakker | H04W 4/22 379/38 |
| 2010/0299442 | A1* | 11/2010 | van Elburg | H04L 63/08 709/229 |
| 2010/0312832 | A1* | 12/2010 | Allen | H04L 65/1016 709/204 |
| 2010/0312897 | A1* | 12/2010 | Allen | H04L 12/1822 709/227 |
| 2011/0032906 | A1* | 2/2011 | Mutikainen | H04L 29/12584 370/331 |
| 2011/0158230 | A1* | 6/2011 | Siegel | H04L 45/308 370/389 |
| 2011/0161505 | A1* | 6/2011 | Siegel | H04L 65/1016 709/228 |
| 2011/0179181 | A1* | 7/2011 | Elz | H04L 65/1069 709/227 |

FOREIGN PATENT DOCUMENTS

| | | |
|---|---|---|
| WO | 2009086939 A1 | 7/2009 |
| WO | 2009146739 A1 | 12/2009 |
| WO | 2010073061 A1 | 7/2010 |

OTHER PUBLICATIONS

3rd Generation Partnership Project, "3rd Generation Partnership Project; Technical Specification Group Services and System Aspects; Telecommunication management; Charging management; Charging Data Record (CDR) parameter description (release 10)", Technical Specification, 3GPP TS 32.298, V10.3.0, Dec. 1, 2010, pp. 1-138, 3GPP, France.

Jennings, C. et al., "Private Extensions to the Session Initiation Protocol (SIP) for Asserted Identity within Trusted Networks", Network Working Group Request for Comments: 3325, Nov. 1, 2002, pp. 1-37, The Internet Society.

Elburg, J. van, et al., "The SIP P-Served-User Private-Header (P-Header) for the 3GPP IP Multimedia (IM) Core Network (CN) Subsystem", Network Working Group Request for Comments: 5502, Apr. 1, 2009, pp. 1-29, The Internet Society.

3rd Generation Partnership Project, "3rd Generation Partnership Project; Technical Specification Group Services and System Aspects; Telecommunication management; Charging management; Diameter charging applications (Release 10)", Technical Specification, 3GPP TS 32.299 V10.1.0, Mar. 1, 2011, pp. 1-148, 3GPP, France.

* cited by examiner

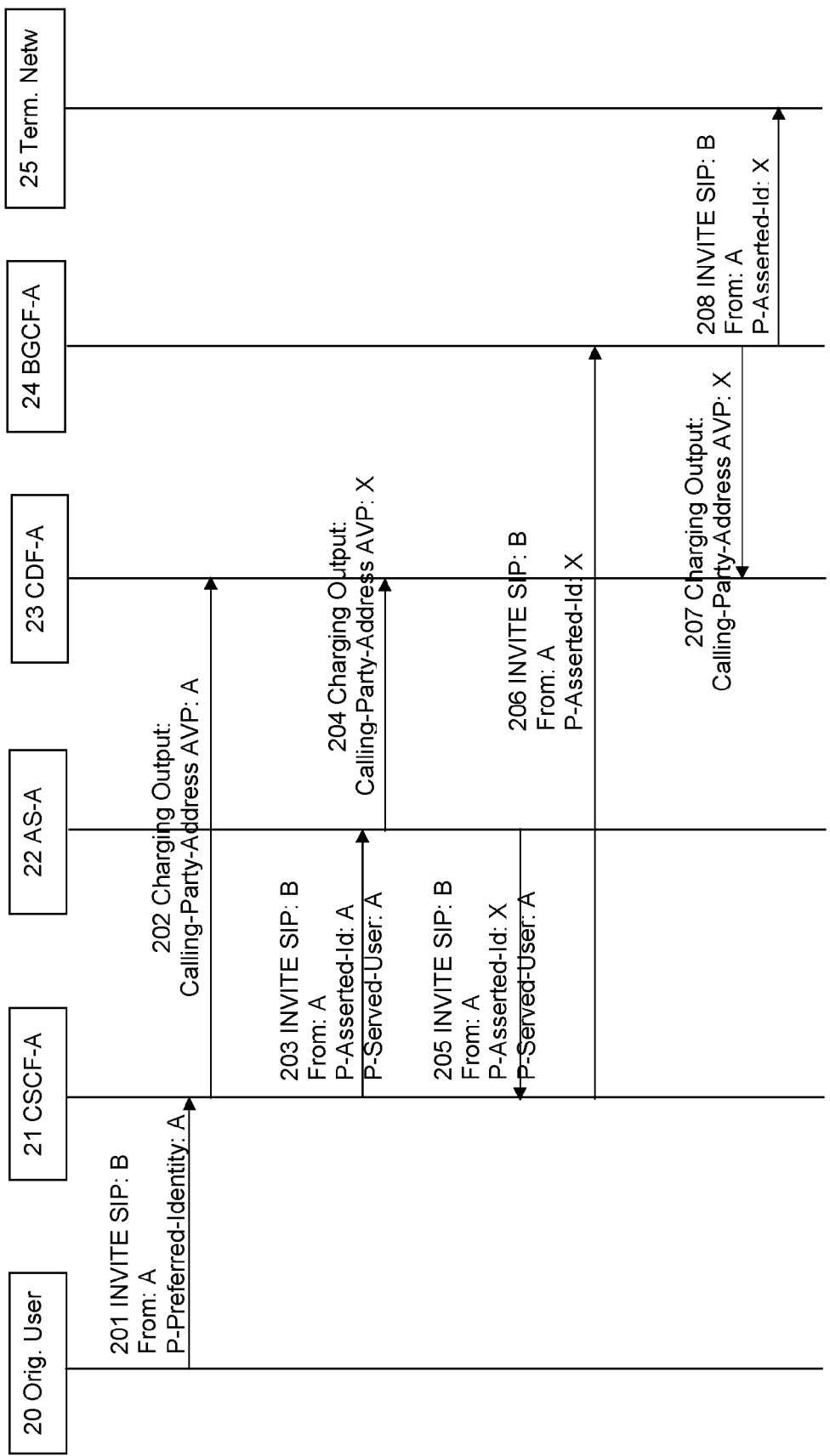

EXTENDING SIP P-SERVED USER HEADER OVER IMS INTERFACES

TECHNICAL FIELD

The present invention relates to the use of the P-Served User Header in Session Initiation Protocol Messages in an IP Multimedia Subsystem (IMS) telecommunications network.

BACKGROUND

IP Multimedia Subsystem (IMS) is the technology defined by the Third Generation Partnership Project (3GPP) to provide IP Multimedia services over mobile communication networks. IMS provides key features to enrich the end-subscriber person-to-person communication experience through the use of standardised IMS Service Enablers, which facilitate person-to-person (client-to-client) communication services as well as person-to-content (client-to-server) services over IP-based networks. The IMS makes use of the Session Initiation Protocol (SIP) to set up and control calls or sessions between subscriber terminals (or between subscriber terminals and IMS network entities such as application servers). Whilst SIP was created as a subscriber-to-subscriber protocol, IMS allows operators and service providers to control subscriber access to services and to charge subscribers accordingly.

FIG. 1 illustrates schematically how the IMS fits into the mobile network architecture in the case of a GPRS/PS access network (IMS can of course operate over other access networks). As shown in FIG. 1, the IMS includes a core network 10 and a service network 15. Call/Session Control Functions (CSCFs) 11 operate as SIP proxies within the IMS core network 10, and interface with other entities such as Border Gateway Control Functions (BGCFs) 12 and Media Resource Function Controllers (MRFCs 13) amongst others. A Proxy CSCF (P-CSCF) is the first point of contact within the IMS for a SIP terminal; a Serving CSCF (S-CSCF) provides services to the subscriber; an Interrogating CSCF (I-CSCF) identifies the correct S-CSCF and forwards to that S-CSCF a request received from a SIP terminal via a P-CSCF. In the IMS Service Network 15, Application Servers (ASs) 16 implement the IMS service functionality. The Application Servers 16 may be connected either as session end-points or "linked in" to a session by an S-CSCF. The S-CSCF is a SIP server, but performs session control as well, handles SIP registrations, and is in the path of all signaling messages, so that it can inspect every message in a session. It decides to which ASs) the SIP message will be forwarded for the provision of services and it provides routing services.

In the IMS Core network 10, the entities communicate with each other over interfaces, many of which are referred to as M-interfaces. There are many such interfaces that have been defined: examples include the Mi interface for exchanging messages between an S-CSCF 11 and a BGCF 12, the Mr interface for exchanging messages between an S-CSCF 11 and an MRFC 13, and the Mw interface for exchanging messages between CSCFs 11. Messages are exchanged between an S-CSCF 11 and an AS 16 in the IMS Service network 15 via the ISC interface. The main functions of the ISC interface are: to notify the AS 16 of the registration state and capabilities of the registered User Equipment (UE); to supply the AS 16 with information to allow it to execute multiple services; and to convey charging function addresses.

In general SIP signals are directed between a pair of end points. In other words the address information provided by the sender in the signal header specifies the recipient end-point (e.g. in the form of a recipient uniform resource identifier, R-URI), and the signal is routed over the network to that end-point. However, there are a number of situations in which SIP signals are re-targeted to a different end-point. Examples of IMS services that involve retargeting include Communication Diversion (CDIV), Do Not Disturb, Communication Distribution, Flexible Alerting, and Conference.

For example, the 3GPP technical specification TS 24.604 Communication Diversion defines how a user B that receives a communication (SIP INVITE) or message (SIP MESSAGE) is able to divert the communication to a new target C—a user, or other entity in a terminating network. Thus, for example, a SIP INVITE may be sent from an entity in an originating network towards user B. The IMS network serving user B includes an S-CSCF assigned to user B and an AS providing a CDIV service. The S-CSCF forwards the SIP INVITE to B's terminating AS, which triggers the CDIV procedure that sends a new SIP INVITE towards user C. The R-URI is changed by B's terminating AS so that the S-CSCF routes the new SIP INVITE towards C's terminating network.

As the example above shows, a service can change the calling or called user identity as a result of service execution. RFC 3325 introduced the concept of the P-Asserted-Identity (PAI) private SIP header to enable a network of trusted SIP servers to assert the identity of authenticated users. According to 3GPP TS 24.229, the P-CSCF inserts in the SIP message a PAI header with a value representing the initiator of the message.

The charging mechanisms for IMS sessions are either offline (post-paid) charging or online (pre-paid) charging. For off-line charging the various IMS network entities that handle transactions act as charge triggering functions (CTFs) generating charging information which is sent to a Charging Data Function (CDF). For on-line charging, the IMS network entities communicate with an Online Charging System (OCS). The information collected by the CDF/OCS in this way is categorized as charging information, but in fact it can be information relating to things other than charging (billing), such as a form of Deep Packet Inspection (DPI), statistics, security, traffic monitoring, etc. and may be used in whatever way the operator sees fit.

The charging information generated for a service shall, according to 3GPP TS 32.299, include a Calling-Party-Address Attribute Value Pair (AVP) based on the PAI header. However, there is no corresponding AVP that carries the address of the served user.

FIGS. 2a and 2b illustrate the SIP signals involved in establishing a typical call from an originating user 20 accessing an originating side network and destined for a terminating user of a terminating side network 25. FIG. 2a concerns mainly the originating side network entities, while FIG. 2b concerns mainly the terminating side. The originating user 20 has an identity (e.g. URI/address) A, while the terminating user has an identity B. Note that the signalling shown in FIGS. 2a and 2b (and also in FIGS. 3a and 3b described later), have been simplified for clarity. In particular, certain SIP messages and Diameter messages used for charging are not shown completely.

In FIG. 2a, the SIP signals are shown in A's home IMS network involving: a CSCF, CSCF-A 21: an Application Server, AS-A 22; a CDF, CDF-A 23; and a BGCF, BGCF-A 24. Signal 201 is a SIP INVITE destined for the terminating user, identified as B, in terminating network 25 sent by the originating user 20 to CSCF-A 21. The SIP INVITE includes the P-Preferred-Identity A of originating user 20. This is replaced with a P-Asserted-Identity by the P-CSCF (not shown in FIG. 2a). Signal 202 is a charging output sent by CSCF-A 21 to CDF-A 23 and includes the identity of the calling party A, derived from the P-Asserted-Identity, in the form of a Calling-Party-Address AVP. Signal 203 is a SIP INVITE destined for B sent by CSCF-A 21 to the AS-A 22 for the provision of a service in relation to the call. The SIP INVITE 203 also includes the P-Asserted-Identity A. Signal 204 is a charging output sent by the AS-A 22 to the CDF-A 23. However, this charging output contains an identity X in the Calling-Party-Address AVP instead of the identity A. Certain services can modify the PAI header (e.g. replace the extension number with the number of the main switchboard), and the new PAI header will be used in the subsequent SIP signalling and also used in the charging output. Thus, in this example, as a consequence of the service provided, the P-Asserted Identity has been changed from A to X. From here on, the PAI header in the SIP messages will all specify the identity X. Signal 205 is a SIP INVITE returned by the AS-A 22 to the CSCF-A 21. This is normally a new call leg (SIP session), and also triggers a new charging session. The SIP INVITE is forwarded in signal 206 to BGCF-A 24. Signal 207 is another charging output sent by BGCF-A 24 to the CDF-A 23, again including the identity X from the received PAI in the Calling-Party-Address AVP. Finally, the BFCF-A 24 forwards the SIP INVITE (signal 208) to the IMS network of the terminating user 25.

In FIG. 2b, the SIP signals are shown in B's home IMS network involving: a CSCF, CSCF-B 26: an Application Server, AS-B 27; a CDF, CDF-B 28; and a BGCF, BGCF-B 29. Signal 211 is the SIP INVITE destined for the terminating user, identified as B, sent by the originating user 20 arriving at CSCF-B 26. The SIP INVITE includes the P-asserted identity A of originating user 20. Signal 212 is a charging output sent by CSCF-B 26 to CDF-B 28 and includes the identity of the calling party A in the form of a Calling-party Address AVP. Signal 213 is a SIP INVITE destined for B sent by CSCF-B 26 to the AS-B 27 for the provision of a service in relation to the call. The SIP INVITE 213 includes a P-Asserted Identity A, and the P-served User identity is B. Signal 214 is a charging output sent by the AS-B 22 to the CDF-B 23. This charging output contains the Calling-Party-Address AVP with the identity A. Signal 215 is a SIP INVITE (normally a new call leg) returned by the AS-B 27 to the CSCF-B 26, and this is forwarded in signal 216 to BGCF-B 29. Signal 217 is another charging output sent by BGCF-B 29 to the CDF-B 28, including the identity A in the Calling-Party Address AVP. Finally, the BFCF-B 24 forwards the SIP INVITE (signal 218) to the terminating user of terminating network 25.

The 3GPP-initiated IETF Request For Comments, RFC 5502 introduced the concept of the P-Served-User (PSU) private SIP header to decouple the meaning of the calling user, and also the called user, from the served user. The PSU header is only defined for the ISC interface between the CSCF and ASs, and the P-Served-User identity is provided so that the ASs can identify the served user in relation to services to be executed for the user. A CSCF will not include the PSU header in SIP messages sent to other IMS entities in the same domain. Thus, for example, a BGCF node will not receive a PSU header, and can only use the PAI header to record the calling party address. The address of the served user, i.e. the one that most likely is to be charged, will not be visible. In many cases the operator would prefer that all collected charging information is consistently identified with the same, served user. This currently requires correlation of charging information from all the nodes that act as CTFs, even if correlation is unnecessary for any other purpose. Implementing such correlation can be a costly and complex process. In some cases, depending on the charging model that is used for a particular service, the operator might wish to change the user that is charged (e.g. between the calling party user and the served user) or to share charges between the calling and served users according to some predetermined split, but this is not currently possible.

SUMMARY

According to a first aspect, the invention provides a method of handling SIP messages in an IMS core network. The method comprises receiving at a first network entity, a first SIP message that includes an identification of a served user to which the first SIP message relates. The first IMS network entity is in the served user's home network. The first SIP message is forwarded as a second SIP message to a second network entity in the served user's home IMS core network. The second SIP message includes a P-Served-User, PSU, header identifying the served user.

According to a second aspect, the invention provides a network entity of an IMS core network which is a home network of a served user. The network entity is configured, on receiving a first SIP message that includes an identification of the served user, to forward the first SIP message as a second SIP message to a second network entity in the served user's home IMS core network. The second SIP message includes a PSU header identifying the served user.

Extending the use of the P-Served-User header to also include messages sent over the M interfaces, ensures that all nodes in the IMS domain are presented with the same user information. This means that each CTF, when generating charging information, can include the served user's address from the PSU header in addition to the address identified by the PAI header.

BRIEF DESCRIPTION OF THE DRAWINGS

FIGS. 2a and 2b are signal diagrams illustrating the SIP signals involved in establishing a typical call from an originating user destined for a terminating user in accordance with currently specified procedures;

DETAILED DESCRIPTION

Figure 1:
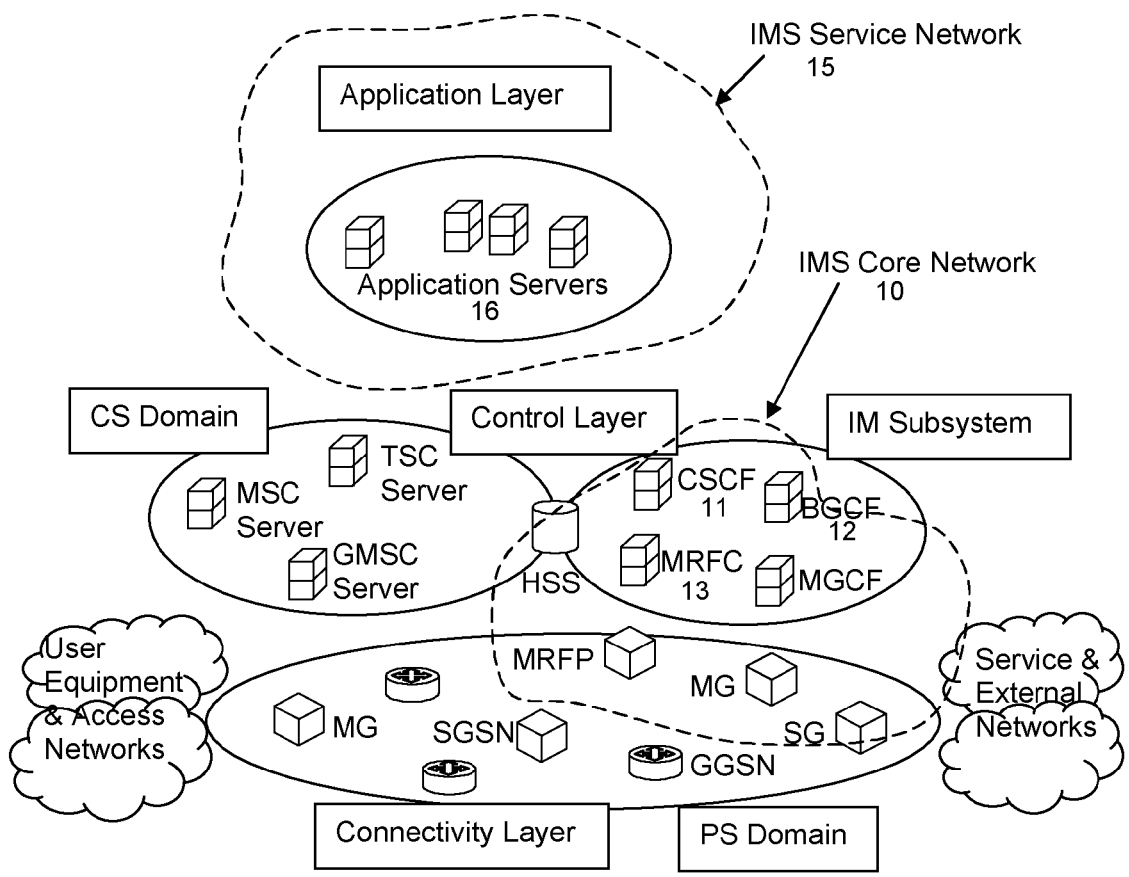
FIG. 1 illustrates schematically the integration of an IP Multimedia Subsystem into a 3G mobile communications system.
Figure 2B:
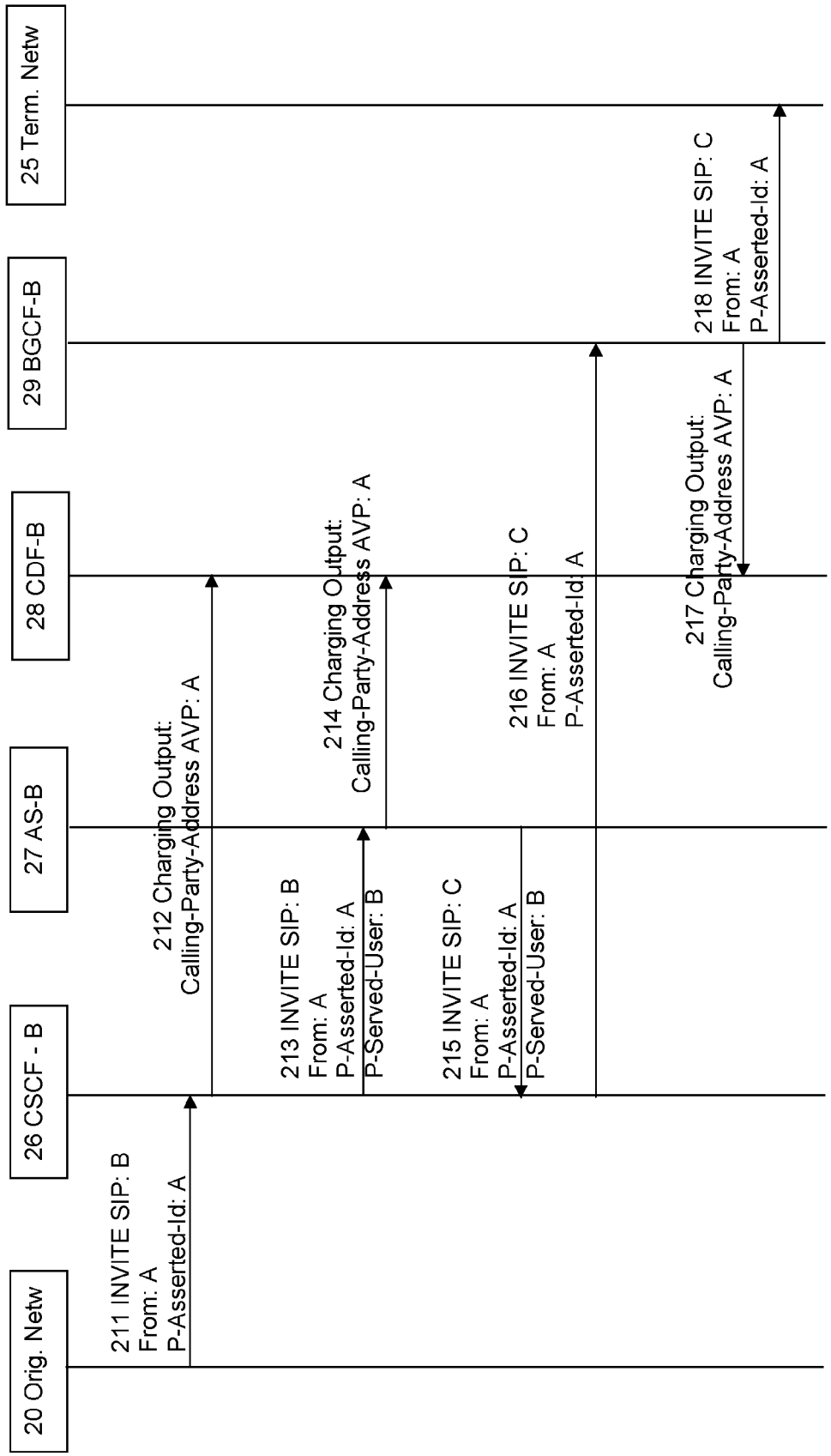
Figure 3A:
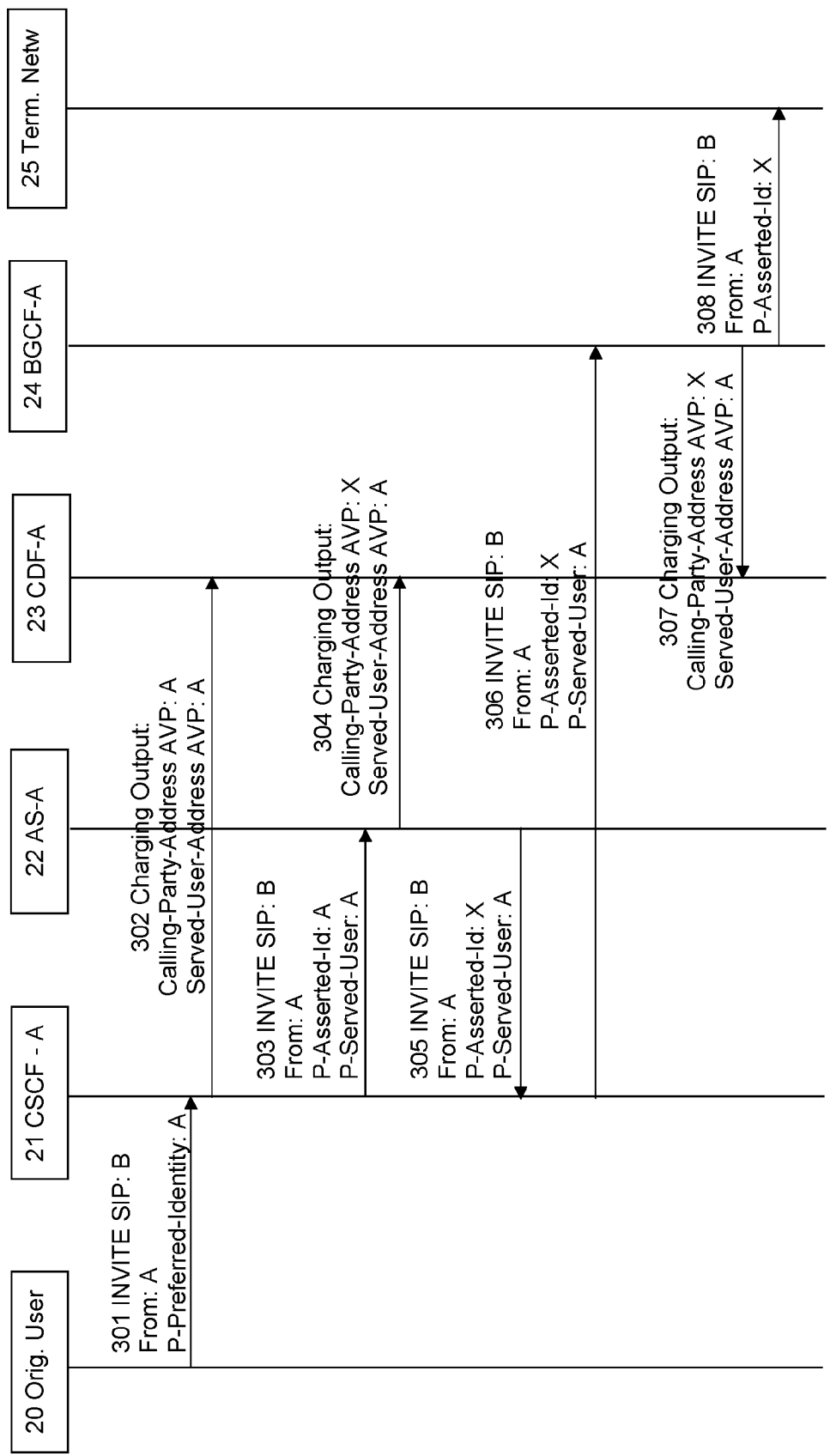
FIGS. 3a and 3b are signal diagrams illustrating the SIP signals involved in establishing a call from an originating user destined for a terminating user, in accordance with an embodiment of the invention.
Figure 3B:
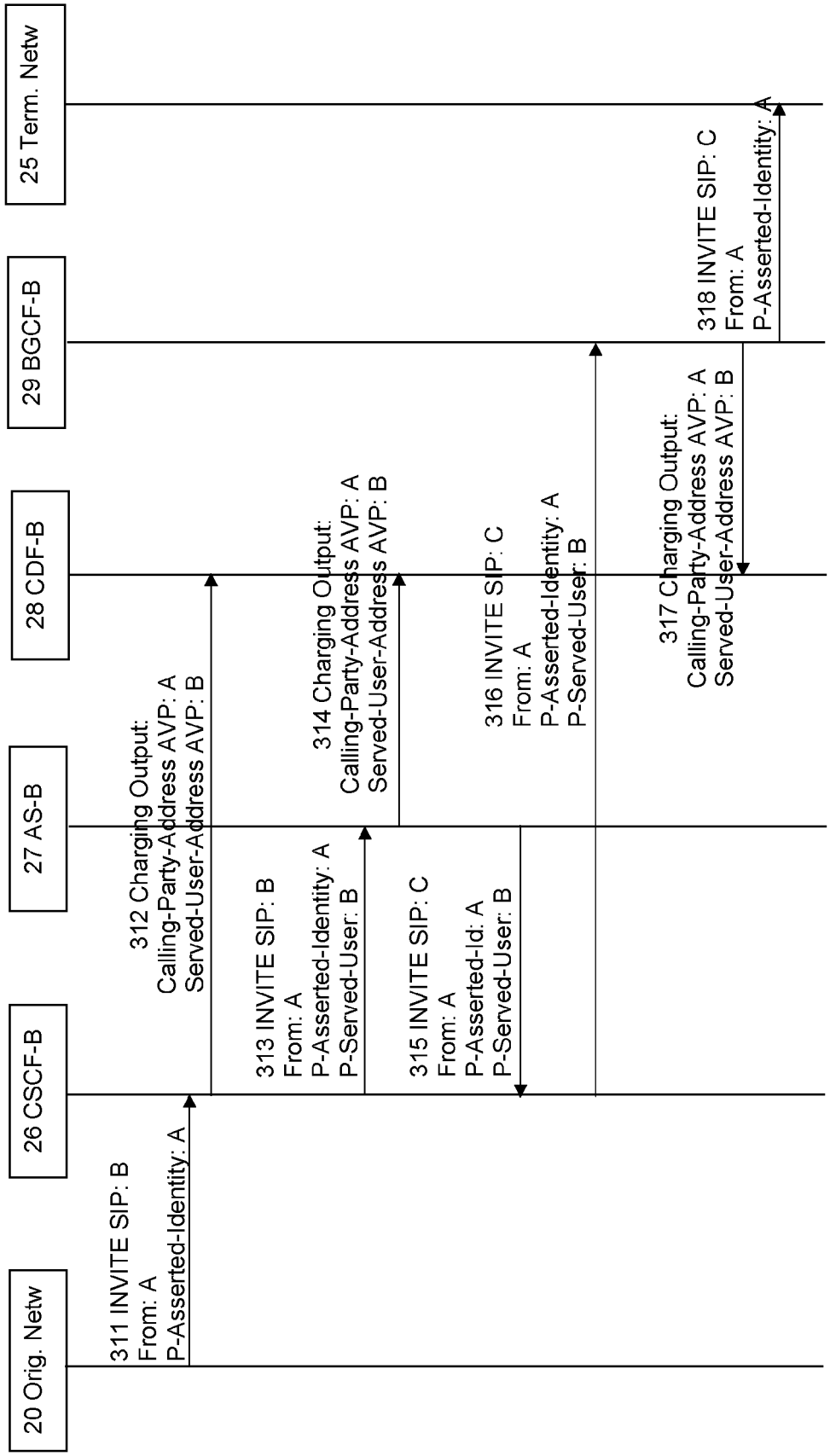

FIGS. 3a and 3b illustrate the SIP signals involved in the same procedure for establishing a call as shown and described above in FIGS. 2a and 2b, but using an extension of the PSU header. The equivalent network entities are identified by the same reference numerals, 20-29. Again, the originating user 20 has an identity A, while the terminating user is a user of terminating network 25 and has an identity B. In FIG. 3a, signal 301 is a SIP INVITE destined for the terminating user 25 exactly as signal 201 in FIG. 2a. The SIP INVITE 301 includes the P-Preferred-Identity A of originating user 20. Signal 302 is a charging output sent by CSCF-A 21 to CDF-A 23. In addition to the identity of the calling party A in the form of a Calling-Party Address AVP, the charging output signal 302 includes a Served-User Address AVP, which also identifies the served user as A. Signal 303 is a SIP INVITE destined for B sent by CSCF-A 21 to the AS-A 22 for the provision of a service in relation to the call. The SIP INVITE 303 includes a P-Served-User (PSU) header identifying A as the served user, as well as the P-Asserted-Identity (PAI) A. This is entirely in accordance with the PSU header introduced in RFC 5502. Signal 304 is a charging output sent by the AS-A 22 to the CDF-A 23. Now, this charging output contains a Served-User-Address AVP, with the identity of the served user A based on the PSU header in the SIP INVITE, in addition to the identity X in the Calling-Party-Address AVP, which is based on the PAI header in the SIP INVITE 303.

Signal 305 is a SIP INVITE returned by the AS-A 22 to the CSCF-A 21, but including the PSU header identifying the served user as A. Note that as currently specified CSCF-A 21 would not be able to do anything with the PSU header or the information contained therein, and would simply discard it in future signalling that it forwards to other IMS entities. However, now CSCF-A 21 includes the PSU header in SIP signals that it forwards to other IMS entities in user A's home IMS domain (core network), such as entities with which it communicates over an M-interface, including BGCF-A 24, as shown in signal 306. (Although not shown, if at this stage CSCF-A 21 was to act as a CTF, then it would send a charging output signal to the CDF-A 23, which would include a Served-User-Address AVP identifying A as the served user, based on the information it received in the PSU header of SIP INVITE 305.) Signal 307 is a charging output sent by BGCF-A 24 to the CDF-A 23, and this time including a Served-User-Address AVP identifying A as the served user, based on the information it received in the PSU header of SIP INVITE 306, and again including the identity X from the received PAI in the Calling-Party-Address AVP. Finally, the BGCF-A 24 forwards the SIP INVITE (signal 308) to the IMS network of the terminating user 25, but this time only with the PAI X (i.e. not including the PSU header). This is because the identity A is that of the user being served by the originating side IMS network, not by the terminating side.

In FIG. 3b, signal 311 is a SIP INVITE destined for the terminating user B of terminating network 25. The SIP INVITE 311 includes the P-Asserted-Identity of originating user 20. Signal 312 is a charging output sent by CSCF-B 26 to CDF-B 28. In addition to the identity of the calling party A in the form of a Calling-Party-Address AVP, the charging output signal 312 includes a Served-User-Address AVP, which identifies the served user as B. Signal 313 is a SIP INVITE destined for B sent by CSCF-B 26 to the AS-B 27 for the provision of a service in relation to the call. The SIP INVITE 313 includes a P-Served-User (PSU) header identifying B as the served user as well as the P-Asserted-Identity (PAI) A. Signal 314 is a charging output sent by the AS-B 27 to the CDF-B 28. Now, this charging output contains a Calling-Party-Address AVP with the identity A as well as a Served-User-Address AVP, with the identity of the served user B based on the PSU header in the SIP INVITE 313.

Signal 315 is a SIP INVITE returned by the AS-B 27 to the CSCF-B 26, but including the PSU header identifying the served user as B. Again, as currently specified CSCF-B 26 would not be able to do anything with the PSU header or the information contained therein, and would simply discard it in future signalling that it forwards to other IMS entities. However, now CSCF-B 26 includes the PSU header in SIP signals that it forwards to other IMS entities over an M-interface, including BGCF-B 29, as shown in signal 316. Signal 317 is a charging output sent by BGCF-B 29 to the CDF-B 28, and this time including a Served-User-Address AVP identifying B as the served user, based on the information it received in the PSU header of SIP INVITE 316, and again including the identity A from the received PAI in the Calling-Party-Address AVP. Finally, the BGCF-B 29 forwards the SIP INVITE (signal 318) to the terminating user of terminating network 25, but this time only with the PAI A (i.e. not including the PSU header).

In the procedure shown in FIGS. 3a and 3b, the CSCF-A 21 creates and uses the P-Served-User header with the identity of A, as defined by the standards over the ISC interface. In addition, the CSCF-A 21 uses the PSU header in the SIP signalling towards the other IMS nodes over the M-interfaces. Similarly, the CSCF-B 26 creates and uses the PSU header with the identity of B in signalling towards other IMS nodes over the M-interfaces. The PSU header is only relevant within the served user's home IMS domain so the border node (e.g. BGCF-A 24 and BGCF-B 29) removes it before forwarding SIP messages outside the domain. The PSU header is used in the signalling in the originating domain for the originating user (as served user, A), as well as in the terminating domain where the terminating user (B) is the served user.

Each CTF in the home domain of the served user can then include the served user's address in the generated charging information, e.g. as a Served-User-Address AVP (in the example shown in FIG. 3, CSCF 21, MTAS 22 and BGCF 24 are all CTFs at some point in the depicted procedure). The Charging System (e.g. CDF 23) will then see the address of the served user as well as the address of the calling and called parties, and can use the appropriate address in the rating and charging decisions for the service in question.

Figure 4:
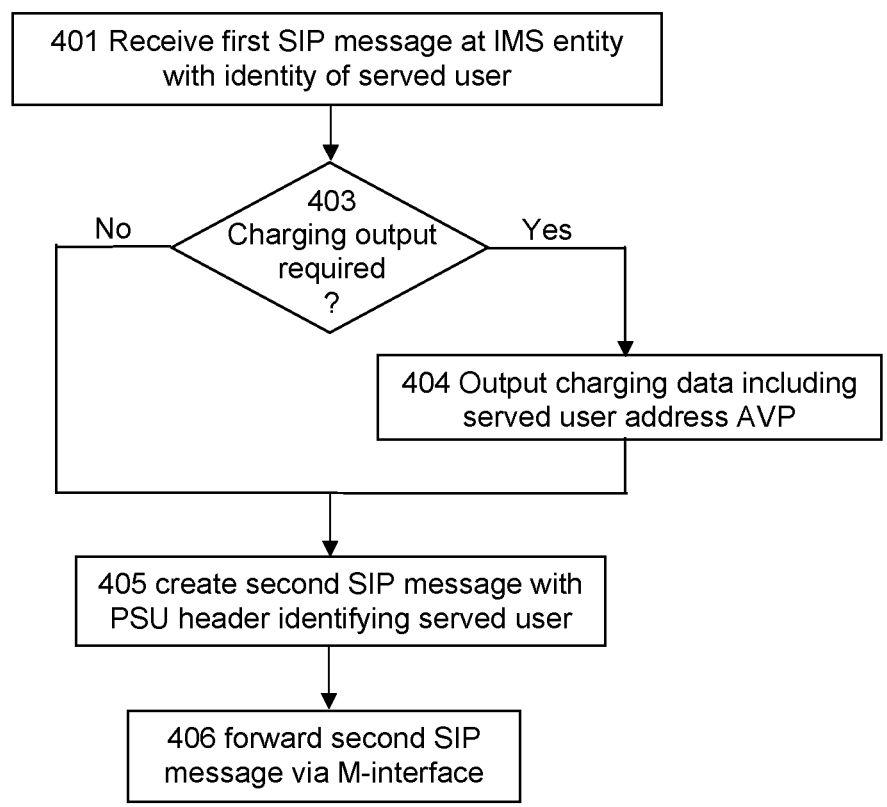
FIG. 4 is a flow diagram illustrating the steps involved in a method in accordance with the invention.

FIG. 4 is a flow diagram illustrating the method steps involved. At step 401 an IMS entity receives a first SIP message that includes an identity of the served user. Note that the first SIP message could be a SIP INVITE (or other message) from the user including the P-Preferred-Identity of the user (as in signal 301 in FIG. 3a), or including a P-Asserted-Identity or could be a SIP message carrying a PSU header received from another IMS entity such as another CSCF, or an AS (as in signal 305 in FIG. 3a). At step 403 if the entity is not required to act as a CTF and no charging output is required, the method continues directly to step 405. However, if the entity is a CTF that is required to provide a charging output, then at step 404 it generates and sends the charging output including the served user address AVP, providing the identity of the served user as received in the PSU header of the received first SIP message. At step 405, the entity creates a second SIP message for forwarding on to another IMS network entity (for example a BGCF if the message is to be sent towards a terminating network). The entity includes the PSU header with the identity of the served user. Then at step 406, the second SIP message is forwarded over an M-interface to the other IMS entity—for example, over the Mi interface to a BGCF. Note that at this stage if the IMS entity is itself a BGCF, then it will not follow steps 405 and 406 when forwarding the SIP message outside the served user's home domain, but instead will forward the SIP message without any PSU header.

The extension of the use of the PSU header, as described above provides a number of advantages over current procedures. Firstly, the Charging System will always know the identity of the served user. Secondly, having both the address of the calling party from the PAI header as well as the address of the served user from the PSU header allows the Charging System to select the appropriate address depending on the service and charging model employed. Thirdly, having both the addresses provides all entities in the user's home domain, including all entities communicating over the M interfaces, within the domain the possibility of selecting the appropriate address for the service in question. In some cases, signalling may also be reduced—for example where an entity would currently have to fetch this information from elsewhere in the network (e.g. from a Home Subscriber Server, HSS, over the Sh interface).

The invention claimed is:

1. A method of charging a user in an IP Multimedia Subsystem (IMS) core network, the method comprising:
    receiving a SIP message at an IMS network entity, the SIP message comprising:
        a P-Served-User (PSU) header comprising an identity of a served user provided by an Application Server; and
        a different header than the PSU header, the different header comprising an identity of a different user than the served user;
    generating, by the IMS network entity, a charging output message from the SIP message such that the charging output message comprises the identity of the served user and the identity of the different user;
    providing, by the IMS network entity, a charging data function with an option to charge either or both of the served user and the different user by transmitting the charging output message to the charging data function.

2. The method of claim 1, wherein the SIP message also includes a P-Asserted-Identity (PAI) of an authenticated user to which the SIP message relates.

3. The method of claim 2, wherein the authenticated user identified by the PAI is different than the served user identified by the PSU header.

4. The method of claim 1, wherein the SIP message includes a P-Preferred-Identity identifying the served user.

5. The method of claim 1, further comprising:
    sending a further SIP message to an application server, the further SIP message including the PSU header identifying the served user;
    wherein receiving the SIP message comprises receiving the SIP message from the served user.

6. The method of claim 1, wherein the PSU header comprises an attribute-value pair comprising the identity of the served user.

7. The method of claim 1, wherein the SIP message is a SIP INVITE.

8. The method of claim 1, further comprising forwarding the SIP message to a border network entity of the served user's home network, for forwarding to a terminating-side network, the PSU header to be removed by the border network entity before the border network entity forwards the SIP message.

9. The method of claim 1, further comprising forwarding the SIP message to a different IMS network entity of the IMS core network via an M-interface.

10. The method of claim 9, wherein the forwarding the SIP message comprises forwarding the SIP message to one of:
    a Proxy Call/Session Control Function;
    a Serving Call/Session Control Function;
    an Interconnection Border Control Function;
    a Breakout Gateway Control Function;
    a Media Gateway Controller Function.

11. The method of claim 1, wherein the receiving the SIP message comprises receiving the SIP message via an M-interface.

12. A network node operating as an IP Multimedia Subsystem (IMS) network entity in an IMS core network, the network node comprising:
    one or more processing circuits configured to:
        receive a SIP message comprising:
            a P-Served-User (PSU) header comprising an identity of a served user provided by an Application Server; and
            a different header than the PSU header, the different header comprising an identity of a different user than the served user;
        generate a charging output message from the SIP message such that the charging output message comprises the identity of the served user and the identity of the different user;
        provide a charging data function with an option to charge either or both of the served user and the different user by transmitting the charging output message to the charging data function.

13. The network node of claim 12:
    wherein the network node functions as a Serving Call/Session Control Function;
    wherein the network node is further configured to forward the SIP message to a different IMS core network entity via an M-interface.

14. The network node of claim 12, wherein the SIP message also includes a P-Asserted-Identity (PAI) of an authenticated user to which the SIP message relates.

15. The network node of claim 12, wherein the SIP message includes a P-Preferred-Identity identifying the served user.

16. The network node of claim 12, wherein the one or more processing circuits are further configured to:
    send a further SIP message to an application server, the further SIP message including the PSU header identifying the served user;
    wherein to receive the SIP message, the one or more processing circuits are configured to receive the SIP message from the served user.

17. The network node of claim 12, wherein the PSU header comprises an attribute-value pair comprising the identity of the served user.

18. The network node of claim 12, wherein the SIP message is a SIP INVITE.

19. The network node of claim 12, wherein the one or more processing circuits are further configured to forward the SIP message to a border network entity of the served user's home network, for forwarding to a terminating-side network, the PSU header to be removed by the border network entity before the border network entity forwards the SIP message.

20. The network node of claim 12, wherein to receive the SIP message, the one or more processing circuits are configured to receive the SIP message via an M-interface.

* * * * *